United States Patent [19]

Schneider

[11] 3,808,358

[45] Apr. 30, 1974

[54] METHOD AND SYSTEM FOR AUTOMATICALLY BALANCING THE COLOR CHANNELS OF COLOR IMAGE TRANSMITTERS

[75] Inventor: Hans-Dieter Schneider, Am Brueckelchen, Germany

[73] Assignee: Robert Bosch Fernsehanlagen GmbH, Darmstadt, Germany

[22] Filed: May 18, 1972

[21] Appl. No.: 254,617

[30] Foreign Application Priority Data

May 21, 1971 Germany........................2125165

[52] U.S. Cl. ........................................ 178/5.4 BT

[51] Int. Cl. ........................................ H04n 9/00

[58] Field of Search......... 178/5.2 R, 5.4 R, 5.4 TE, 178/5.4 BT

[56] References Cited

UNITED STATES PATENTS

| | | | |
|---|---|---|---|
| 3,627,911 | 12/1971 | Kubota et al. | 178/5.4 R |
| 3,558,809 | 1/1971 | Aoki | 178/5.4 R |
| 3,479,448 | 11/1969 | Kousman | 178/5.2 R |
| 3,548,083 | 12/1970 | Cahen | 178/5.4 R |

*Primary Examiner*—Robert L. Richardson
*Assistant Examiner*—George G. Stellar
*Attorney, Agent, or Firm*—Littlepage, Quaintance, Murphy & Dobyns

[57] ABSTRACT

Automatic balancing of color channels in a color-image transmitter by providing white-level balance from a neutral white part of the scene, providing black-level balance while no image is produced, then correcting intermediate-level values for gamma correction.

8 Claims, 5 Drawing Figures

METHOD AND SYSTEM FOR AUTOMATICALLY BALANCING THE COLOR CHANNELS OF COLOR IMAGE TRANSMITTERS

BACKGROUND OF THE INVENTION

The invention relates to automatically balancing the color channels of color-image transmitters, especially color television cameras.

A difficulty in the adjustment of amplifiers of color television transmitters results from the necessity of matching the amplification in the channels of the individual chrominance components in such a way that the signal values of all channels approach, in the case of a chromatically neutral pattern with high luminance (white), 100%, and in the case of a corresponding pattern with low luminance (black) zero. The same applies to the adjustment of gamma predistortion, i.e., for the operating range on the characteristic of the color image transmitter at any luminance values ranging between the aforementioned limit values of white and black. It is easy to comprehend that many skilled manipulations, such as the provision of neutral wedges, special test patterns, measuring devices, oscillographs, and adjusting operations, are necessary in order to fulfill these requirements for white, black, and gamma balancing.

SUMMARY OF THE INVENTION

The invention provides a method in which the corresponding parameters of an amplifier are automatically balanced, and thus the cited difficulties are avoided.

The method of the invention is characterized in that, for the white balancing, the color-image transmitter picks up a chromatically neutral white surface, and that for black balancing, the light supply and/or the signal production in the optical-electrical converters of the color image transmitter is interrupted. Moreover, for the balancing of the gamma predistortion, the luminous flux in the color channels is stepwise (or continuously) varied, preferably by shutter adjustment, so that various signal values occur successively in the color channels. Finally, the signal values in the color channels are brought up by means of adjusting elements controlled by the signal difference to the value of the signal value of the white and green channel, which value serves as reference signal.

The invention has the advantage that only a chromatically neutral white surface is required, and neither measuring devices nor expert knowledge are necessary.

It is suitable to store at first, for the balancing of the gamma predistortion, all deviations of the various signal values between color signal and reference signal and to carry out the balancing to minimize the sum of the differences of all measuring values. Thus the adjustment can be made very precisely and the color balance can remain the same over the full useful length of the blanking characteristic.

It is also advantageous to have the balancing proceed in an automatically controlled sequence, and to carry out, when a program for the sequence is desired in order to balance the gamma predistortion, first the white and black balancing automatically by using the programs concerned, because the white and black balancing values are a precondition for the correct balancing of the gamma predistortion.

A further advantage of the method of the invention consists in the use thereof in color television outdoor transmissions which have uncontrollably varying color temperatures, e.g., in the case of passing clouds. In this case, there is need to provide on camera (in the scene) a suitable pattern with so-called measuring white, at which pattern the television camera is briefly directed for automatic white balancing.

In a further development of the invention, manual control can be replaced by a sensing device provided in the color image transmitters. "Sensing device" means a measuring apparatus consisting, for example, of photoelectric cells, which continuously measure the color temperature and allow control of the white balance accordingly.

DESCRIPTION OF THE PREFERRED EMBODIMENT

Figures 1, 2:
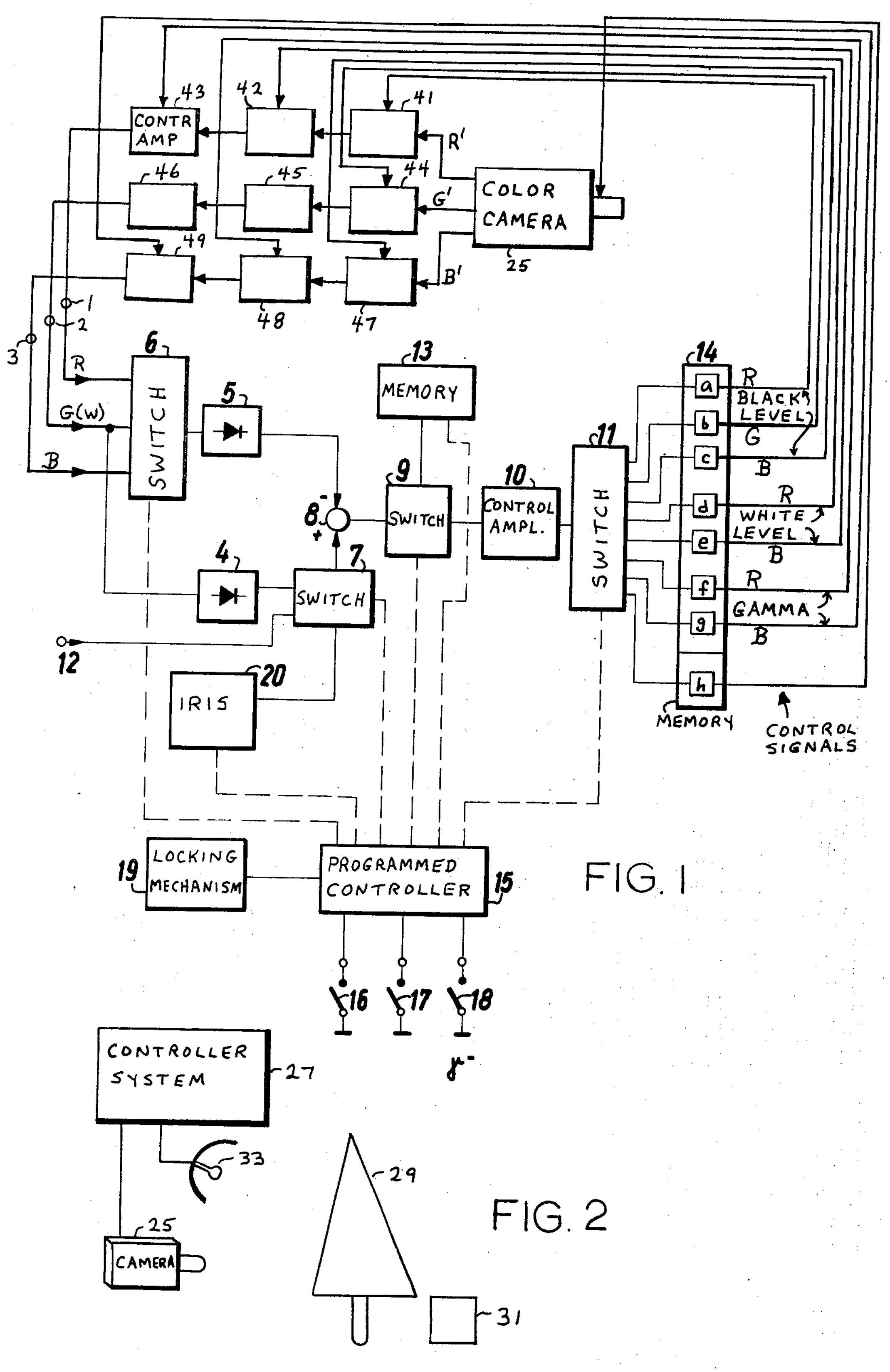
FIG. 1 illustrates the preferred apparatus for carrying out the invention.
FIG. 2 illustrates the use of an apparatus of FIG. 1.

The figure shows an embodiment of a combined device for automatically balancing the black and white value and the gamma predistortion. Color-value signals R, G(W), and B are fed to terminals 1, 2, 3. Since it is feasible to feed to terminal 2 a white signal W instead of a green signal G, the signal used is labelled G(W) to indicate that either is feasible. The signal fed to terminal 2 is the reference signal to whose value the two other signals are to be brought up.

For carrying out the automatic white balancing, the reference signal G(W) is fed to a rectifier 4 which yields a d.c. voltage equalling approximately the maximum Value of the signal. A similar rectifier 5 supplies the maximum value of the color-value signal R or B. An input switch 6 applies the color-value signal to rectifier 5. The d.c. voltage passes from rectifier 4 to a stage 8. The d.c. voltage from rectifier 5 passes directly to a stage 8, wherein the difference of the two d.c. voltages from the two rectifiers is formed. The differential voltage passes to a control amplifier 10 via a further switch 9. An output switch 11 feeds the differential voltage to a control element (such as a motor-driven potentiometer) in an amplifier of the color-value channel for the red or blue color-value signal. Individual control amplifiers 41–49 are shown in the output path of a camera 25. The amplification of these amplifiers is controlled by direct voltage control signals obtained from the respective memory sub-units of memory 14. The outputs of these amplifiers provide the R, G(W) and B signals at the input of switch 6. The control element is adjusted by the differential voltage until, by feedback, the differential voltage becomes practically zero. This is the case when the white-level color-value signal for red or blue is of the same magnitude as the white-level color-value signal for green, which serves as reference signal.

In a similar way, the automatic black balancing is carried out. The reference value used in this case, however, is not a color signal but a d.c. voltage which is fed to the apparatus at terminal 12, and whose value corresponds to the peak value of the color signal for a black image. The rectified color value signals are again compared with this reference value, including, in this case, not only the red and blue, but also the third (green or white) signal. The three color-value signals are fed successively, by means of input switch 6, to rectifier 5. The corresponding d.c. voltages are compared successively with the reference d.c. voltage in stage 8, to which, on the other side, the reference voltage is fed from terminal 12 via switch 7. The differential voltages formed, in stage 8, pass via switch 9 and control amplifier 10 to output switch 11, which feeds the differential voltage involved to the corresponding control element for the adjustment of the black-level value in the three color channels R, G, B, and adjusts, in the same manner as described above, the control device until the difference between the color-value (maximum value) signal fed to the apparatus, and the rated value practically disappears.

Figure 3:
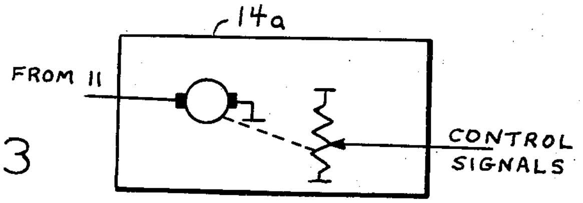
FIG. 3 is a diagram of one of the memory units from memory 14.

Thus, the final value of the blanking characteristics (for a white image) and the initial value (black value) becomes the same in all three color channels. In order also to obtain agreement between the extreme values of the curved blanking characteristics, a comparison of the signal values is made at several points of the blanking characteristics, e.g., at 30%, 50%, and 70% of the maximum value, and the gamma predistortion in the color channels is made to vary with the difference. In order to carry out the gamma balancing, the deviations of the various signal values between the color signal for red or blue or the reference signal (green or white) are first stored and the balancing to the minimum of the sum of the difference of all measuring values is carried out. The difference formation between the color-value signal for red and blue, and the green or white signal serving as reference value takes place in the same manner as in the white balancing by difference formation of the rectified voltages in device 8, but in this instance in each case the different signal levels of, e.g., 30%, 50%, and 70% of the white value. The three pairs of differential voltages, however, are not employed directly for readjustment of gamma amplifiers in the color channels, but pass by way of switch 9 to a memory device 13. In device 13, moreover, the sum of the differences of all measuring values is formed, which sum is transmitted, by suitable adjustment of switch 9, to control amplifier 10 and therefrom by way of output switch 11 to the terminals R and B of a memory unit 14, more fully illustrated in FIG. 3. These terminals are connected to the control elements for adjusting the curvature of the gradation characteristic in the red and blue channels. Thus, the gamma predistortion is balanced to minimize the differences of all measuring values.

The necessary switching of input switch 6, of switches 7 and 9, and of output switch 11 for effecting the automatic balancing of the color channels for the white value, the black value, and also the gamma predistortion, and furthermore for the shutter adjustment for varying the luminous flux at the last-mentioned balancing, is carried out preferably by means of a programmed controller 15. When a manually-operated button 16 or 17 or 18 is operated, depending upon which balancing is to take place, the button causes the measuring program concerned to proceed automatically in the correct manner and sequence. Such programmed switch controllers for sequentially operating a plurality of switches in a predetermined pattern are well-known per se in the prior art. Since the balancing of the gamma predistortion depends on the previous balancing of the white and black value, operating errors can be avoided by supplementing programmed controller 15 with a locking mechanism 19 which, when the program for balancing the gamma predistortion is called for by pressing key 18, causes first the programs for the white and black balancing to proceed.

In operation, the programmed controller is operated by activating either switch 16, 17, or 18, Closing switch 16 causes the black balance to be carried out automatically, as does switch 17 with the white balance and switch 18 with the gamma balance.

The black balance then runs as follows: After closing switch 16, switch 7 is connected to the input from terminal 12. The output switch 11 is switched to operate the motor-potentiometer of memory sub-unit **14*a*, and terminal 1 is connected via switch 6 to rectifier 5. Then the connections from switch 11 to sub-unit 14*a* and from terminal 1 via switch 6 to rectifier 5 are disconnected. Next, switch 11 switches to sub-unit 14*b* and switch 6 connects input 2 to rectifier 5. Next, these connections are disconnected, and switch 11 switches to sub-unit 14*c* and switch 6 connects input terminal 3 to rectifier 5. Next these connections are disconnected and switch 7** drops out.

The white balance runs as follows: Switch 7 is closed. The input of switch 7 is connected to rectifier 4. Switch 11 connects to memory sub-unit **14*d*. Switch 6 connects terminal 1 to rectifier 5. Then switches 11 and 6 are disconnected. Next, switch 11 connects to memory sub-unit 14*e* and switch 6 connects terminal 3 to rectifier 5. Next, switches 11, 6 and 7** are disconnected.

Figure 4:
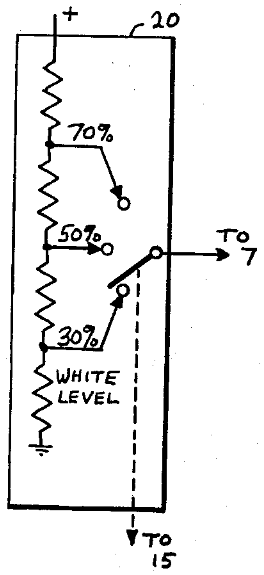
FIG. 4 is a diagram of one embodiment of iris 20.

The gamma balancing runs as follows: Switch 18 is closed. The red balancing proceeds by connecting switch 11 to memory sub-unit **14*h*. Iris 20 is switched to its 30% value, as illustrated in FIG. 4. The output of iris 20 is connected via switch 7 to element 8. Switch 6 connects terminal 2 with rectifier 5. Next switches 11, 7 and 6 are disconnected. Then switch 6 connects terminal 1 with rectifier 5, and switch 7 connects terminal 2 to element 8, and switch 9 switches the resulting difference signal from element 8 to memory 13. Then switches 9, 7 and 6** are disconnected. The program sequence for the 50% and 70% blending states takes place sequentially in the manner described with appropriate changes in iris values. Then the gamma balancing for the blue channel takes place is a similar fashion.

The method of the invention can be applied in studios where the program sequence is automatically controlled by a computer. It can be done advantageously within the scope of a testing program, usually provided in studio automatization, for the image signal transmitter. When the testing program is switched on by the computer, the test can thus be complemented by the automatic balancing of the black and white value, and the gamma predistortion as well. In order to be able to test subsequently the correct adjustment of the gamma predistortion, it is in this case suitable to print in the testing record of the computer for the automatic sequence of the programs and the testing the differential values for the various signal levels when the gamma predistortion is being balanced.

The color-value signals for the automatic balancing of the white value as well as of the gamma predistortion are obtained by having the color-image transmitter to be balanced pick up a chromatically neutral white surface. The balancing is therefore correct only when the color temperature of the light which illuminates the white surface is the same as the scenery illumination and the latter remains essentially constant.

Even at varying color temperature, e.g., in the case of outside pictures subject to temporary cloudiness, the employment of the method of the invention for automatic white balancing allows a great simplification. By simple button pushing to select the program for the white balancing, variations in the color temperature of the light can be compensated at any time. It is only necessary that in the scenery a "measuring white" is present to which the camera can be shifted before the white balancing is carried out.

Figure 5:
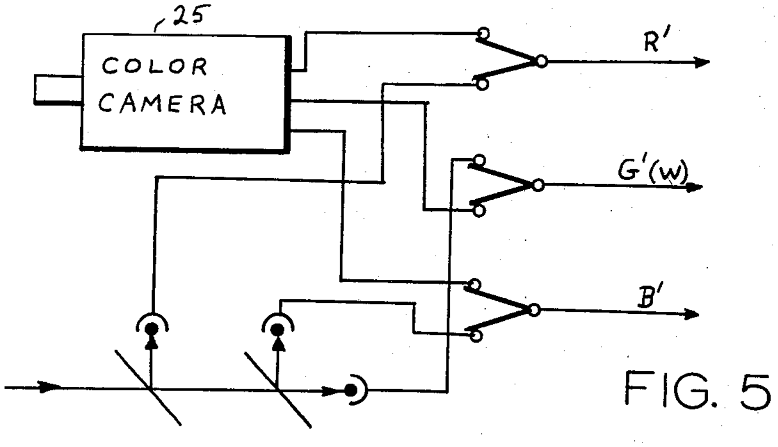
FIG. 5 is a diagram of a sensing device for use in the invention.

In a further development of the invention, the adjustment above described to the color temperature can be automatized by placing a sensing device into the scenery which readjusts the white balancing continuously according to a given program. "Sensing device" means a measuring device which feeds signals corresponding to the primary colors. One such sensing device is shown in U.S. Pat. No. 3,626,088 of the present invention, and shown generally in FIG. 5. These signals are fed to the apparatus instead of the color value signals of the image signal transmitter and control then automatically the white balancing in the manner described above.

FIG. 2 illustrates the use of a television camera 25 under control of such a system 27 to photograph a scene 29 including a neutral white surface 31. A light source 33 can be shut off by system 27 for the black level test. Either source 33 or camera 25 can be controlled for the intermediate level tests.

What is claimed is:

1. A method for automatically balancing color channels in a color-image transmitter as it transmits an image of a scene comprising the steps of:

A. providing a chromatically neutral white surface in the scene,

B. directing the transmitter to said surface to provide white-level signals representative of the surface in various ones of said channels, C. electrically comparing the amplitudes of different white-level color components from the white-level signals in each channel to provide electrical signals indicative of white-level errors in the color balance for each channel, D. correcting the amplitudes of the white-level color components in each channel in response to the electrical signals indicative of white-level errors, E. shutting off light from the scene to the transmitter while deriving black-level signals in various channels representative of the lightless scene, F. electrically comparing the amplitudes of different black-level color components from the black-level signals in each channel with a reference signal to provide electrical signals indicative of black-level errors in the color balance for each channel, G. correcting the amplitudes of the black-level color components in each channel in response to the electrical signals indicative of black-level errors, H. varying the light intensity from the scene to the transmitter to successively produce a set of intermediate level signals representative of the surface at each of a plurality of intermediate level light values, I. electrically comparing the amplitudes of different intermediate-level color components from the intermediate-level signals in each channel at each intermediate level to provide electrical signals indicative of intermediate-level errors in the color balance, J. storing the electrical signals indicative of intermediate level errors, and K. after storing all of the signals from step J, providing feedback signals to adjust the amplitudes of the respective color components to minimize the sum of all of the stored errors, thereby correcting gamma predistortion of the color components of the transmitted image.

2. A method according to claim 1 wherein the step of shutting off the light is accomplished by shutting off a light supply.

3. A method according to claim 1 wherein the step of shutting off the light is accomplished by interrupting signal production at an optical-to-electrical converter in the color-image transmitter.

4. A method according to claim 1 wherein the step of varying the light intensity is carried out in a stepwise fashion.

5. A method according to claim 1 wherein the step H is not carried out until completion of steps D and G.

6. A method according to claim 1 wherein the steps of claim 1 are controlled by providing a stored program of sequential control for the steps and by selection elements of the stored program by manual switch operation.

7. A system for automatically balancing color channels in a color-image transmitter as it transmits an image of a scene comprising:

A. means for providing a chromatically neutral white surface in the scene,

B. means for directing the transmitter to said surface to provide white-level signals representative of the surface in various ones of said channels, C. means for electrically comparing the amplitudes of different white-level color components from the white-level signals in each channel to provide an electrical signal indicative of white-level erros in the color balance for each channel, D. means in each channel responsive to the indicated white-level errors in each channel for correcting the amplitudes of the white-level color components in each channel according to the indicated white-level errors for that channel, E. means for shutting off light from the scene to the transmitter while deriving black-level signals in various channels representative of the lightless scene, F. means for electrically comparing the amplitudes of different black-level color components from the black-level signals in each channel with a reference signal to provide electrical signals indicative of black-level errors in the color balance for each channel, G. means for correcting the amplitudes of the black-level color components in each channel in response to the electrical signals indicative of black-level errors, H. means for varying the light intensity from the scene to the transmitter to successively produce a set of intermediate-level signals representative of the surface at each of a plurality of intermediate level light values, I. means for electrically comparing the amplitudes of different intermediate-level color components from the intermediate-level signals in each channel at each intermediate level to provide electrical signals indicative of intermediate-level errors in the color balance, J. means for storing the electrical signals indicative of intermediate level errors, and K. gamma-predistortion correction means operative after the storage of the intermediate-level electrical signals for providing feedback signals to adjust the amplitudes of the respective color components to minimize the sum of all the stored errors, thereby correcting gamma predistortion of the color components of the transmitted image.

8. A system according to claim 7 further comprising a measuring device in the scene for detecting color temperatures of the light illuminating the scene continuously during the transmittal of the image of the scene and for providing signals for continuous readjustment of the white-level values of the transmitted image.

* * * * *